Dec. 15, 1931.         A. GOODWIN         1,836,658
GAS MOTOR
Filed March 21, 1929     4 Sheets-Sheet 1
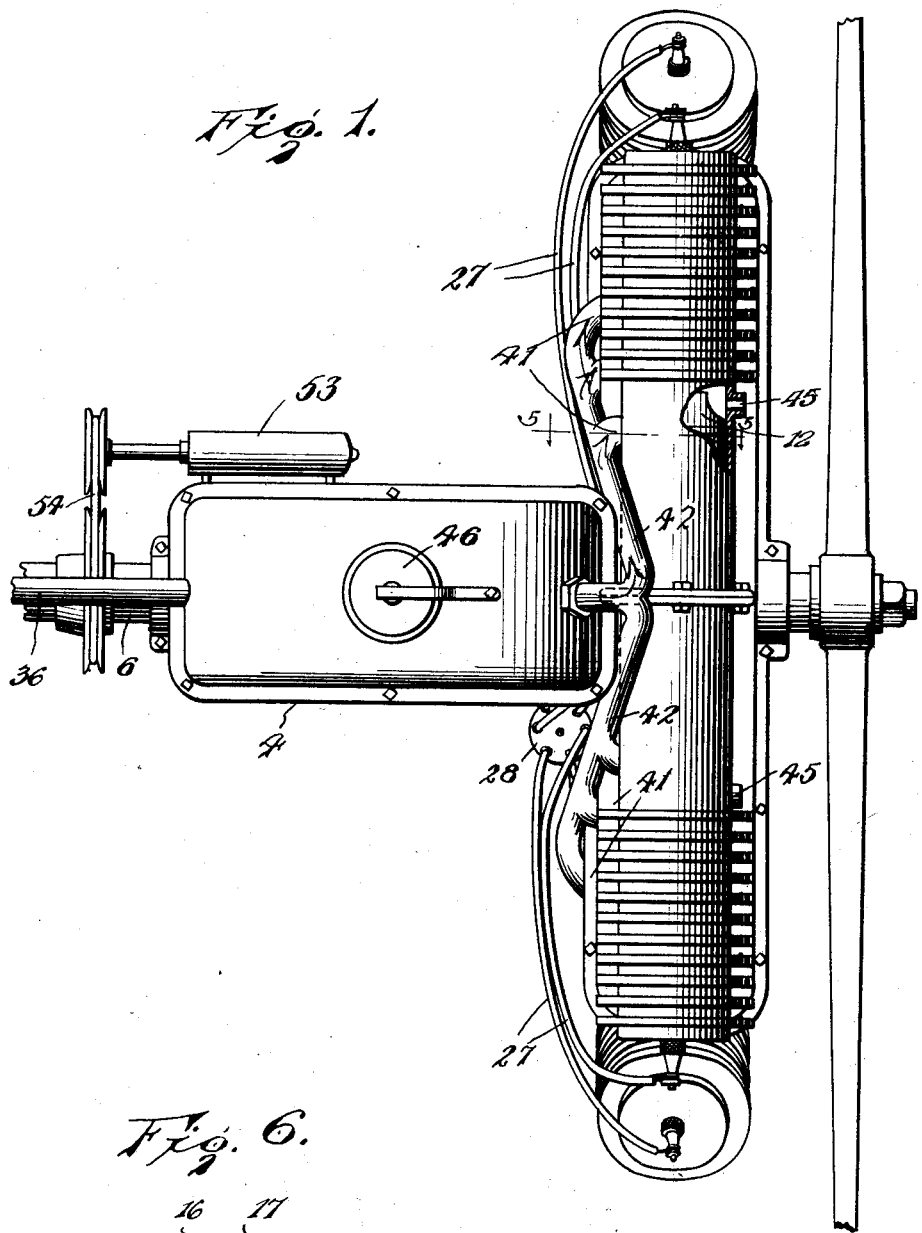
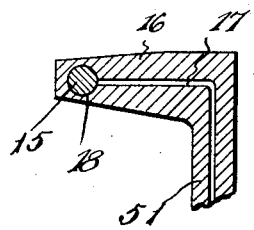
Inventor
A. Goodwin
By Lacey & Lacey, Attorneys

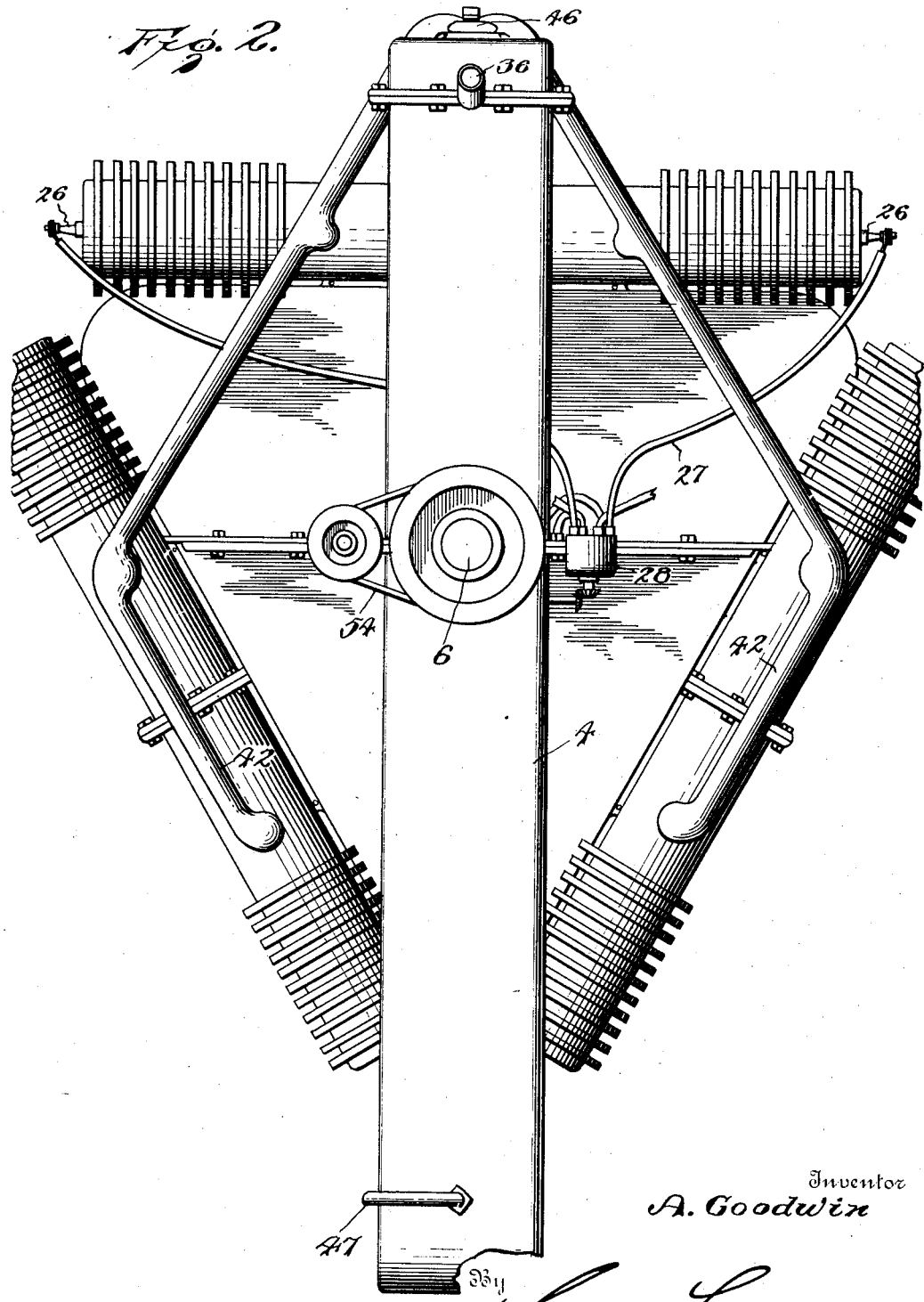

Dec. 15, 1931.  A. GOODWIN  1,836,658
GAS MOTOR
Filed March 21, 1929   4 Sheets-Sheet 3
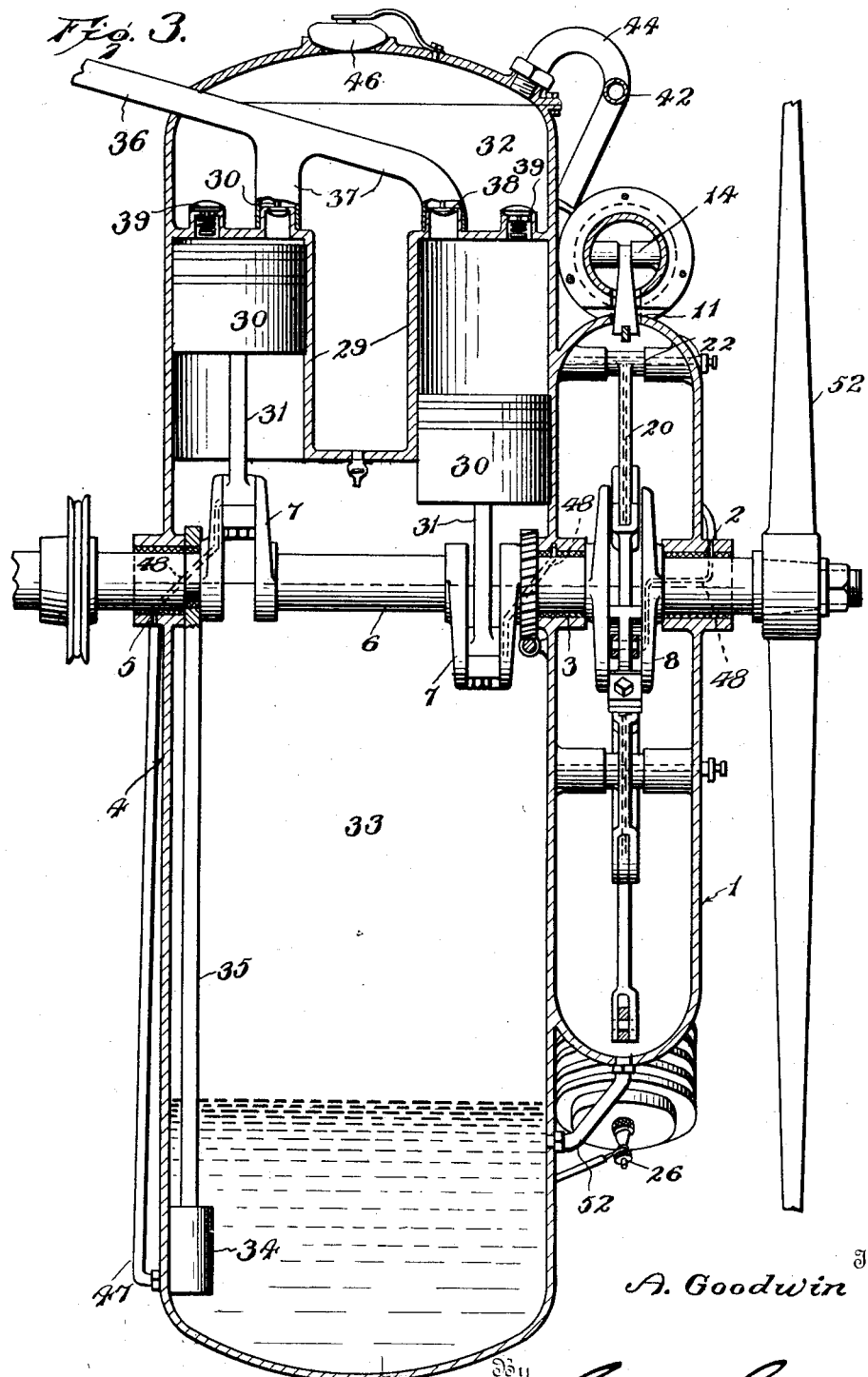

Dec. 15, 1931.　　　　　A. GOODWIN　　　　1,836,658
GAS MOTOR
Filed March 21, 1929　　4 Sheets-Sheet 4

Inventor
A. Goodwin

By Lacey & Lacey,
Attorneys

Patented Dec. 15, 1931

1,836,658

UNITED STATES PATENT OFFICE

ANTON GOODWIN, OF KINGFISHER, OKLAHOMA

GAS MOTOR

Application filed March 21, 1929. Serial No. 348,916.

The present invention is directed to improvements in gas motors.

The primary object of the invention is to provide a motor of this kind so constructed that the pistons, during their travel, will control both the inlet and exhaust ports.

Another object of the invention is to provide a device of this kind constructed in such manner that the fuel charge will be compressed and conducted under pressure through the inlet ports into the cylinders.

Another object of the invention is to provide a device of this character constructed in such manner that the incoming charge of fuel will expel the exhaust gases from cylinders, thus maintaining the cylinders in a thoroughly scavenged state.

Another object of the invention is to provide a motor of this type wherein the vaporized fuel is drawn from the carburetor and compressed and then forced under pressure into the cylinders, thereby eliminating the use of complicated valve structures.

Another object of the invention is to provide a motor which is extremely simple in construction, efficient in operation, durable, and one which can be manufactured at a small cost.

With these and other objects in view, this invention resides in the novel features of construction, formation, combination and arrangement of parts to be hereinafter more fully described, claimed, and illustrated in the accompanying drawings, in which:

Figure 1 is a top plan view.

Figure 2 is a rear elevation.

Figure 3 is a longitudinal sectional view through the device.

Figure 4 is a vertical sectional view through the cylinders and crank case.

Figure 5 is a sectional view on the line 5—5 of Figure 1.

Figure 6 is a detail sectional view showing the connecting rod connection.

Referring to the drawings, the numeral 1 designates a crank case which is triangular in shape and has carried by its outer wall a bearing 2 and having a bearing 3 carried by its inner wall, the inner wall forming a part of one wall of the fuel pressure tank 4, said tank having a bearing 5 carried by one wall which is aligned with the bearings 2 and 3. Journaled in these bearings is a crank shaft 6, the cranks 7—7 thereof being operable in the tank while the crank 8 thereof operates in the crank case 1.

Suitably mounted upon the crank case 1 are cylinders 9 having slots 10 formed therein which register with slots 11 formed in the crank case, and slidable in the cylinders are tubular pistons 12 provided with openings 13 which coincide with the slots 10 and 11. The cylinders 9 may be sectionalized or they may have removable heads to permit the pistons to be readily placed therein or removed therefrom. The pistons are provided with centrally disposed bearings 14 supporting the pins 15 and to which are connected tapered heads 16, said heads having oil ducts 17 therein which open into the pin openings 18 so that oil can pass around the pins for lubricating the cylinders and pistons. The heads 16 have bolted thereto one of the ends of the connecting rods 19, the other ends thereof being pivotally connected to the plates 20, as at 21, said plates being pivotally connected to the crank case, as at 22.

To the crank 8 of the crank shaft is connected a split sleeve 23 having a rigid arm 24 carried thereby which is pivotally connected to one of the plates 20, said sleeve being pivotally connected to the remaining plates by links 25.

The cylinders 9 have spark plugs 26 mounted in the ends thereof which have leading thereto conductors, these conductors leading from the distributor 28 driven in any approved manner from the crank shaft 6.

The tank 4 has mounted therein a pair of laterally spaced cylinders 29 in which are reciprocable pistons 30, the connecting rods 31 thereof being connected with the cranks 7—7 of the crank shaft 6. It will be observed that the cylinders divide the tank into upper and lower compartments 32 and 33, the former serving to store the compressed fuel while the latter provides space for the crank shaft 6 and accommodates the oil pump 34. said pump being operable by the pitman 35 driven by the crank shaft 6.

Leading from the carburetor (not shown) is a supply pipe 36 which enters the chamber 32 and has branches 37 which are connected to the respective cylinders 29, there being check valves 38 to prevent back pressure in the branches and pipe upon the upstroke of the pistons. The cylinders are provided with spring controlled valves 39 which open under pressure of the fuel upon the upstroke of the pistons. Obviously, the vaporized fuel will be alternately drawn into the cylinders, and compressed and discharged into the chamber 32, the pressure of such fluid being sufficient to force the same into the cylinders 9 past the check valves 40, said check valves serving merely to prevent back firing into the chamber 32. These valves are mounted in the fuel supply pipes 41, which conduct fuel under pressure from the manifold 42 to the inlet ports 43 of the cylinders 9, said manifold being connected to the pipe 44 leading from the chamber 32. The cylinders 9 are provided with exhaust ports 45 which may be connected with any suitable type of exhaust manifold, if desired.

The top of the tank is provided with a spring controlled safety valve 46 which will open should an explosion take place in the chamber 32 from any unforeseen cause.

In order to lubricate the various bearings, a main oil feed pipe 47 connects with the pump 34 and has branches leading in a well known manner to the ducts 48 of the crank shaft and pivoted connections 22. Oil will enter the ducts 49 and 50 and the ducts 51 and 17 of the plates and rods 19. A suitable oil gage is located in the oil system, as is customary.

Obviously, the fuel charge will be forced past the valves 40 under pressure and will alternately enter the compression chambers of the respective cylinders. The travel of the pistons in the respective cylinders will alternately admit the charge, and since the cylinders uncover the exhaust ports during their travel, free exhaust of burnt gases is had. It will be further observed that the incoming charge of fuel will aid in dispelling the burnt gases, thus maintaining the cylinders in a thoroughly scavenged condition.

Since the explosions take place in each end of the cylinders and in proper timed relationship, the pistons will be compelled to reciprocate, thus exerting force upon the connecting rod 19, and from thence to the plates 20 and links 25 and arm 24 to the crank shaft, thus imparting rotary movement to the crank shaft 6, which may be used for transmitting power for various purposes but in this instance it is shown used in connection with an air craft propeller 52 for driving the same.

Rotary movement of the crank shaft 6 will obviously reciprocate the pistons 30 in the cylinders 29 in order to alternately draw in a charge of combustible fuel and expel the same under pressure into the compartment 32 to be subsequently admitted to the cylinders 9.

A generator 53 is supported by the tank 4 and is driven from the crank shaft 6 by a sprocket chain 54, as more clearly shown in Figure 1 of the drawings. The speed of the motor can be conveniently controlled by the usual throttle valve which is associated with the conventional form of carburetor, and it is desired that the motor be equipped with a battery system of ignition.

It will be noted that the cylinders are compactly arranged, and as shown, three are employed, the construction and arrangement being such that the three cylinders will produce the power of a six cylinder engine or motor.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

What is claimed is:

An internal combustion motor for aircraft comprising a crank case of substantially triangular longitudinal section, cylinders provided with explosion chambers at each end disposed exteriorly upon the ends of the crank case, and having their longitudinal axes forming the sides of a triangle, hollow tubular pistons in said cylinders, a crank shaft journaled in the side walls of said crank case, a sleeve on said crank shaft, substantially triangular rock plates each terminally pivoted at one corner to one side wall of the crank case, a master rod for each piston secured to said sleeve and pivotally connected at the outer end to the apex of the corresponding rock plate, and a substantially right angular piston rod for each piston having one leg pivotally connected to the free corner of the corresponding rock plate and extending longitudinally along an end wall of the crank case, and having the other leg entering the tubular piston through longitudinal slots in said crank case and said piston and being pivoted to the center of the piston.

In testimony whereof I affix my signature.

ANTON GOODWIN. [L. s.]